United States Patent
Lee et al.

(10) Patent No.: US 7,698,524 B2
(45) Date of Patent: Apr. 13, 2010

(54) APPARATUS AND METHODS FOR CONTROLLING OUTPUT OF CLOCK SIGNAL AND SYSTEMS INCLUDING THE SAME

(75) Inventors: Chang-Duck Lee, Seoul (KR); Sam-Yong Bahng, Gyeonggi-do (KR); Sin-Ho Yang, Gyeonggi-do (KR); Kui-Yon Mun, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 765 days.

(21) Appl. No.: 11/418,559

(22) Filed: May 5, 2006

(65) Prior Publication Data

US 2007/0124558 A1      May 31, 2007

(30) Foreign Application Priority Data

Nov. 30, 2005    (KR)    ........... 10-2005-0115738

(51) Int. Cl.
*G06F 13/00*    (2006.01)
*G06F 12/00*    (2006.01)

(52) U.S. Cl. ............... 711/167; 711/100; 711/163

(58) Field of Classification Search ............ 711/100, 711/105, 154, 163, 167; 710/107, 113, 305, 710/309
See application file for complete search history.

(56) References Cited

U.S. PATENT DOCUMENTS

| | | | | |
|---|---|---|---|---|
| 5,708,794 | A * | 1/1998 | Parks et al. ............ | 711/154 |
| 5,764,932 | A * | 6/1998 | Gochman et al. ........ | 710/107 |
| 6,073,211 | A * | 6/2000 | Cheng et al. .......... | 711/122 |
| 6,088,751 | A * | 7/2000 | Jaramillo ............. | 710/116 |
| 6,430,658 | B1 * | 8/2002 | Nunez et al. .......... | 711/146 |
| 6,912,609 | B2 * | 6/2005 | Stuber et al. ......... | 710/107 |
| 7,366,825 | B2 * | 4/2008 | Williams et al. ....... | 711/103 |
| 2002/0120820 | A1 * | 8/2002 | Higuchi et al. ........ | 711/154 |
| 2005/0251672 | A1 * | 11/2005 | Kim .................... | 713/1 |

FOREIGN PATENT DOCUMENTS

| | | |
|---|---|---|
| JP | 2002093173 | 3/2002 |
| KR | 1020010007594 | 1/2001 |
| KR | 1020020040111 | 5/2002 |
| KR | 1020040100673 | 2/2004 |

* cited by examiner

*Primary Examiner*—Tuan V. Thai
(74) *Attorney, Agent, or Firm*—Myers Bigel Sibley & Sajovec

(57) ABSTRACT

An apparatus for controlling data exchange with a memory device includes an interface configured to receive an arbitration signal indicating when the apparatus has use of a shared bus and an interface to the memory device configured to provide a clock signal to the memory device that synchronizes data exchange between the apparatus and the memory device. A selection circuit selectively supplies the clock signal to the memory device responsive to the arbitration signal.

16 Claims, 7 Drawing Sheets

APPARATUS AND METHODS FOR CONTROLLING OUTPUT OF CLOCK SIGNAL AND SYSTEMS INCLUDING THE SAME

CROSS-REFERENCE TO RELATED PATENT APPLICATIONS

This application is related to and claims priority from Korean Patent Application No. 10-2005-0115738, filed on Nov. 30, 2005, in the Korean Intellectual Property Office, the disclosure of which is incorporated herein by reference in its entirety.

BACKGROUND OF THE INVENTION

The present invention relates to a control apparatus and method, and more particularly, to an apparatus and method for controlling supply of a clock signal to a memory device.

Figure 1:
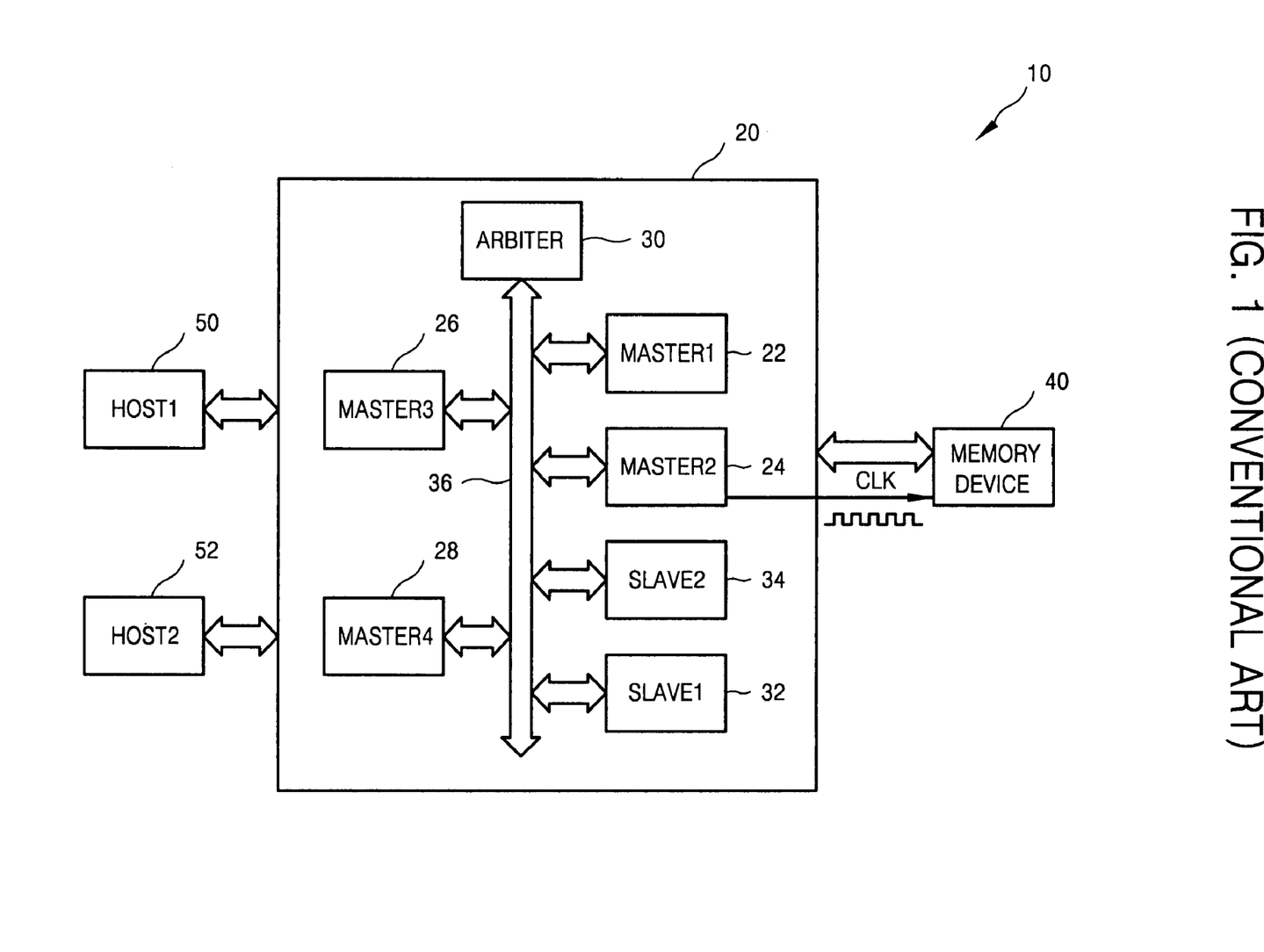
FIG. 1 is a block diagram of a system having a memory device and a conventional controller.
Figure 2:
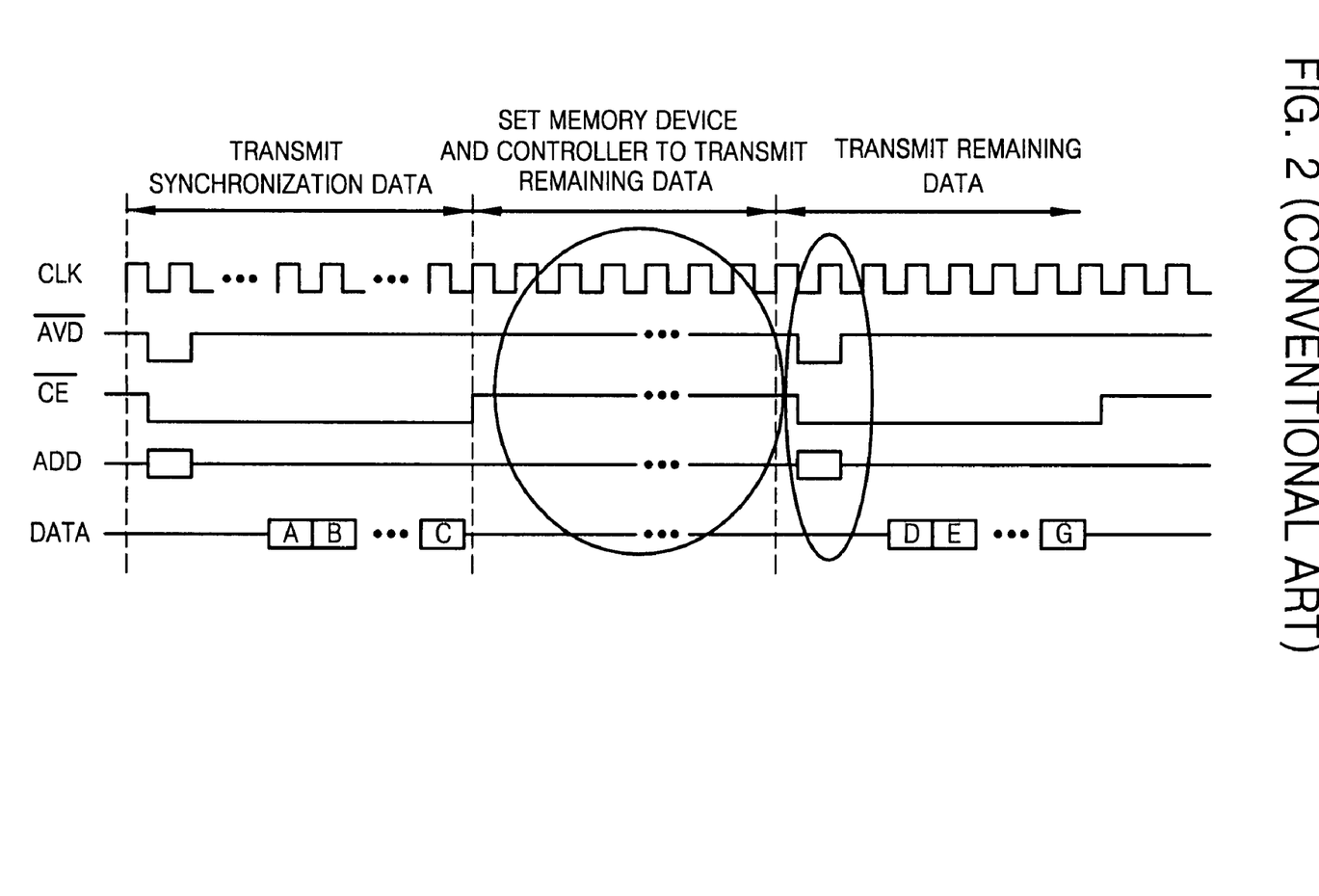
FIG. 2 is a timing diagram of signals output from a master that interfaces with the memory device illustrated in FIG. 1.

FIG. 1 is a block diagram of a system 10 including a memory device 40 and a conventional controller 20. FIG. 2 is a timing diagram of signals output from a master that interfaces with the memory device 40 illustrated in FIG. 1. Referring to FIGS. 1 and 2, the system 10 includes a controller 20, the memory device 40, a first host 50 and a second host 52.

The controller 20 includes first through fourth masters 22, 24, 26, and 28, an arbiter 30, a first slave 32, a second slave 34, and a bus 36. It is assumed for purposes of this description that the first slave 32 is a data random-access memory (RAM) that stores data exchanged with the third master 26, and the second slave 34 is a data RAM that stores data exchanged with the fourth master 28.

As the first through fourth masters 22, 24, 26, and 28 share the bus 36 in the controller 20, they may access the bus 36 according to a priority protocol controlling use or ownership of the bus 36. The arbiter 30 arbitrates the priority of use of the bus 36 between the first through fourth masters 22, 24, 26, and 28 according to a specified method or protocol, such as a fixed priority method or a round-robin method. Accordingly, while one of the first through fourth masters 22, 24, 26, and 28 uses the bus 36, the other masters must wait for some time period until they obtain priority to use of the bus 36.

If the first host 50 exchanges a large amount of data, e.g., 2 KB of data, with the memory device 40 through the third master 26, the first slave 32, and the second master 24 using the bus 36, the second master 24 may need to use/control the bus 36 for a long period of time. Also, when the second host 52 exchanges a large amount of data with the memory device 40 via the fourth master 28, the second slave 34, and the second master 24 using the bus 36, the second master 24 may also need to use/control the bus 36 for a long period of time.

However, when a master (e.g., the first master 22) having higher priority than the second master 24 requests the arbiter 30 allow it to use/control the bus 36 and uses the bus 36, the second master 24 must wait for a period of time until the first master 22 loses the ownership of the bus 36. That is, when a master (e.g., the first master 22) having higher priority than the second master 24 requests the use of the bus 36, the second master 24 generally stores a predetermined address ADD of currently transmitted data A, B, . . . , C in a predetermined storage device, transfers the ownership of the bus 36 to the first master 22, and waits for a period of time until the higher priority master loses the ownership of the bus 36.

Referring to FIG. 2, when the second master 24 regains the ownership of the bus 36, the second master 24 of the controller 20 and the memory device 40 generally must be reset to transmit the remaining data D, E, . . . , G. Then, the second master 24 may transmit the address following the address of the already transmitted data (e.g., data C) to the memory device 40, and exchange the remaining data D, E, . . . , G with the memory device 40. As a result, the data transmission performance (efficiency) between the second master 24 of the controller 20 having the first through fourth 22, 24, 26, and 28, and the memory device 40 may be significantly lowered.

Also, even if data cannot be exchanged between the second master 24 of the controller 20 and the memory device 40 (for example, when the second master 24 loses the ownership of the bus 36), the second master 24 typically continuously supplies a clock signal CLK to the memory device 40, which may cause unnecessary consumption of power in the second master 24 and the memory device 40.

SUMMARY OF THE INVENTION

Embodiments of an apparatus for controlling data exchange with a memory device includes an interface configured to receive an arbitration signal indicating when the apparatus has use of a shared bus and an interface to the memory device configured to provide a clock signal to the memory device that synchronizes data exchange between the apparatus and the memory device. A selection circuit selectively supplies the clock signal to the memory device responsive to the arbitration signal.

In some embodiments, the apparatus further includes a delay logic configured to receive an input clock signal and to delay the input clock signal to generate the clock signal to the memory device. The selection circuit is configured to receive a DC-level signal input via a first input terminal and the delayed input clock signal via a second input terminal and to supply a selected one of the DC-level signal input or the delayed input clock signal to the memory device responsive to the arbitration signal. The memory device may be a logic-embedded NAND flash memory.

In other embodiments, the apparatus further includes a mode information storage circuit that stores an indication of a current data transfer mode and a selection signal generation circuit that receives the arbitration signal and a signal from the mode information storage circuit indicating the current data transfer mode and generates a selection signal based on a logic combination of the received signals. The selection circuit is configured to supply a selected one of a DC-level signal and the clock signal to the memory device responsive to the selection signal from the selection signal generation circuit. The memory device may be a NAND flash memory core, a NOR interface, and an SRAM buffer.

In further embodiments, a controller includes a bus and a first master coupled to the bus and a second master coupled to the bus. The second master is communicatively coupled to an external semiconductor device and is configured to selectively supply a clock signal to the semiconductor device, that synchronizes data exchange with the semiconductor device, responsive to an arbitration signal associated with the bus. An arbiter coupled to the bus is configured to arbitrate ownership of the bus between the first and second masters and to generate the arbitration signal to communicate ownership of the bus. The second master may supply the clock signal to the semiconductor device responsive to a first state of the arbitration signal indicating the second master has ownership of the bus or a DC-level signal to the semiconductor device responsive to a second state of the arbitration signal indicating the second master does not have ownership of the bus.

In other embodiments, the second master includes a selection circuit. The selection circuit includes a first input terminal that receives the DC-level signal, a second input terminal that receives the clock signal and an output terminal. The selection circuit is configured to output one of the DC-level signal and the clock signal via the output terminal responsive to the arbitration signal.

In yet other embodiments, the second master includes a mode information storage circuit that stores an indication of a current data transfer mode. A selection signal generation circuit of the second master receives the arbitration signal and a signal from the mode information storage circuit indicating the current data transfer mode and generates a selection signal based on a logic combination of the received signals. A selection circuit of the second master receives the DC-level signal and the clock signal and selectively outputs the DC-level signal or the clock signal responsive to the selection signal from the selection signal generation circuit. The second master may further include a clock signal generator that generates the clock signal.

In further embodiments, the second master includes a mode information storage circuit that stores an indication of a current data transfer mode, wherein the current transfer mode comprises a synchronous data transfer mode or an asynchronous data transfer mode. A selection signal generation circuit receives the arbitration signal and a signal from the mode information storage circuit indicating the current data transfer mode and generates a selection signal based on a logic combination of the received signals. A delay circuit receives an input clock signal and delays the input clock signal for a predetermined time to generate the clock signal. A selection circuit receives the DC-level signal and the delayed input clock signal from the delay circuit and selectively outputs the DC-level signal of the delayed input clock signal responsive to the selection signal from the selection signal generation circuit.

In other embodiments, systems are provided including controllers as described above in combination with the semiconductor device. The semiconductor device is configured to communicate data with the controller in synchronization with the clock signal from the controller.

In yet further embodiments, a system includes a memory device and a controller. The controller includes a shared bus and a plurality of masters coupled to the shared bus. A first one of the masters is configured to selectively supply a clock signal of a DC-level signal to the memory device to synchronize data transfer between the first master and the memory device in a synchronous data transfer mode responsive to an arbitration signal indicating when the first master has ownership of the shared bus. The system further includes an arbiter that is configured to arbitrate ownership of the shared bus among the plurality of masters and to generate the arbitration signal to communicate ownership of the shared bus.

In other embodiments, the first master supplies the clock signal to the memory device when the first master has ownership of the bus, and the DC-level signal to the memory device when the first master does not have ownership of the bus. The memory device may be configured to maintain data, which is to be transmitted to the first master, responsive to the DC-level signal and then transmit the maintained data responsive to later receipt of the clock signal.

In further embodiments, methods of supplying a clock signal from a controller coupled to a shared resource to a memory device are provided. The clock signal is used for synchronizing data transfer between the controller and the memory device. The method includes supplying a DC-level signal from the controller to the memory device when the controller does not have ownership of the shared resource. Data that is to be transferred from the memory device is held responsive to supplying the DC-level signal. The clock signal is supplied to the memory device when the controller regains the ownership of the internal resources. The held data is transferred from the memory device responsive to supplying of the clock signal.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will filly convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3:
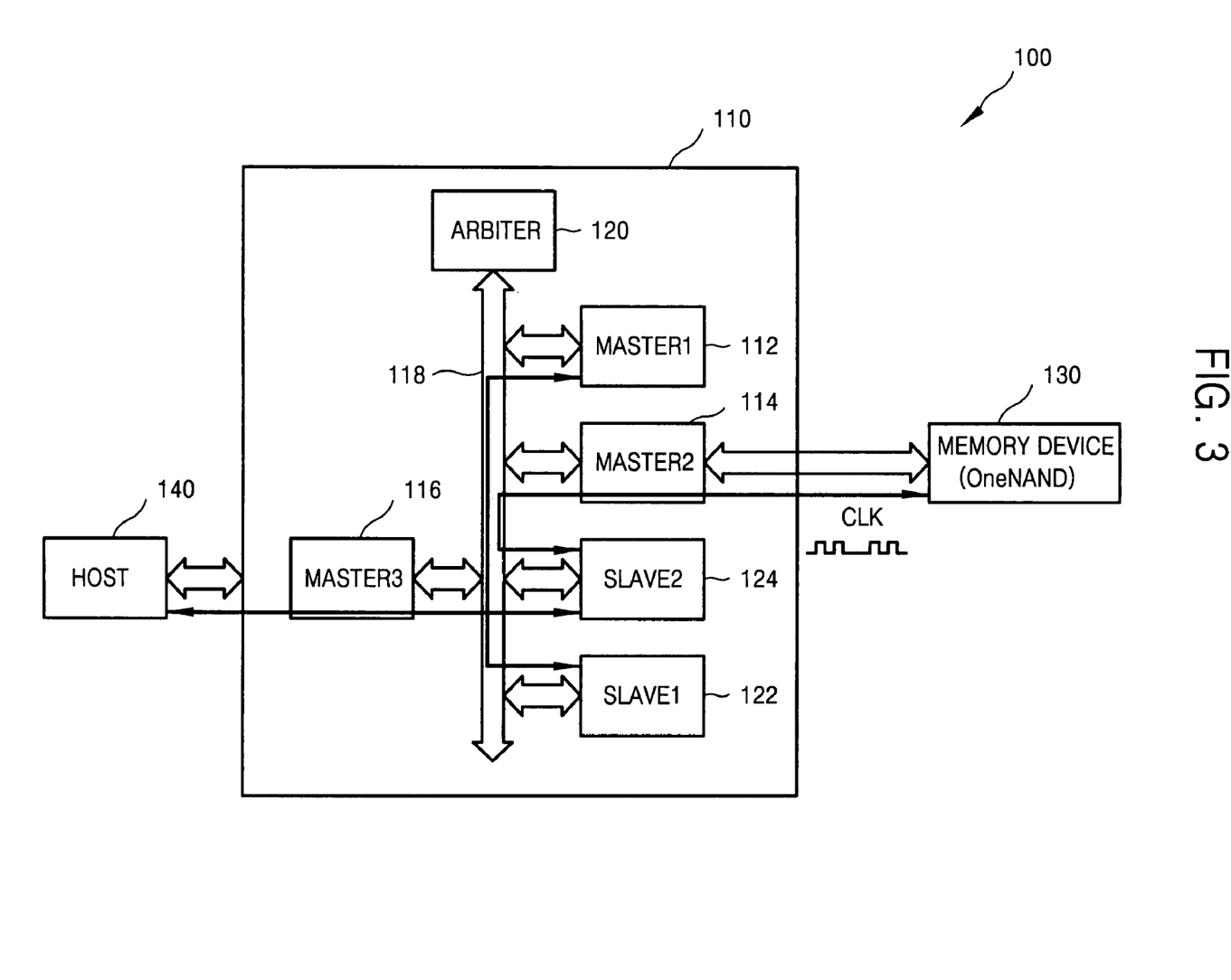
FIG. 3 is a block diagram illustrating a system having a memory device and a controller according to some embodiments of the present invention.

Embodiments of the present invention will now be further described with reference to FIGS. 3-7. FIG. 3 is a block diagram illustrating a system 100 having a memory device 130 and a controller 110 according to some embodiments of the present invention. As shown in FIG. 3, the system 100 includes a controller 110, a memory device (or integrated circuit device) 130 and a host 140. The system 100 may be used, for example, with a handset (e.g., a mobile communication device), a digital television (TV), a digital camera, a global positioning system (GPS) device, a memory card, etc. The memory card may be, for example, a secure digital (SD) card or a multimedia card (MMC).

The controller 110 exchanges predetermined data with the memory device 130 under control of the host 140. The illustrated controller 110 includes a plurality of masters, illustrated as first through third masters 112, 114, and 116 in FIG. 3, a bus 118, an arbiter 120, a first slave 122, and a second slave 124. The bus 118 is an example of a shared internal resource.

Figure 6:
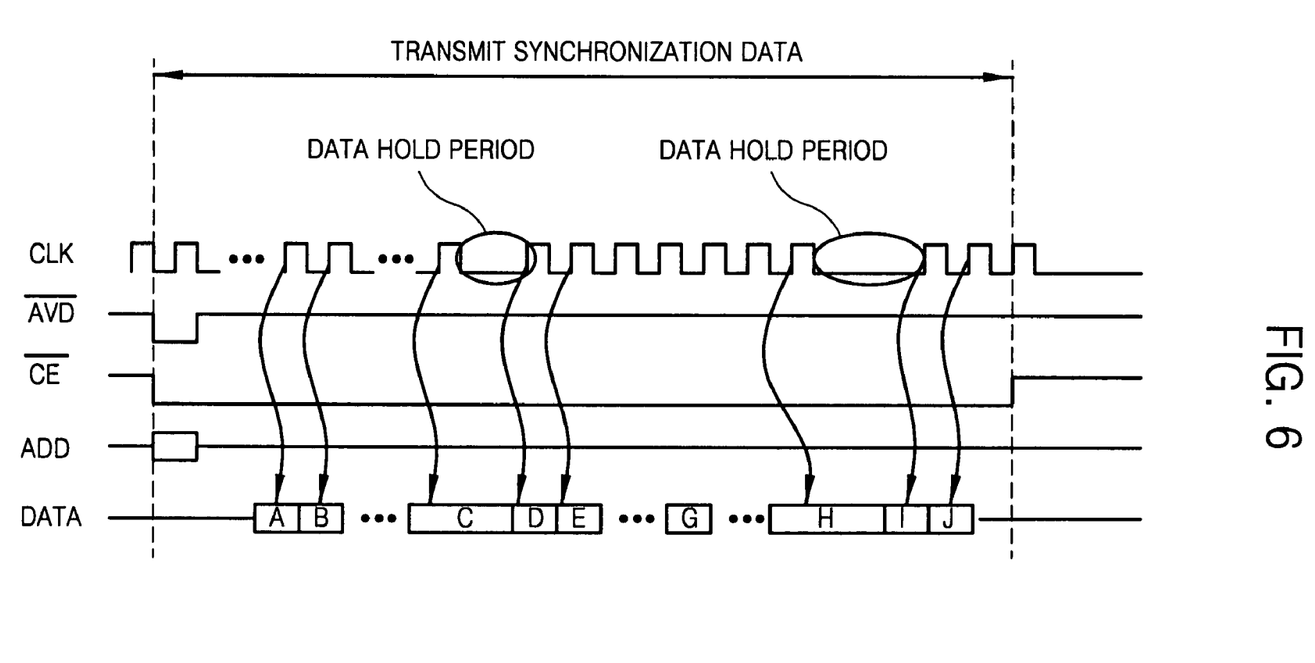
FIG. 6 is a timing diagram illustrating signals output from a master, such as shown in FIGS. 3 through 5, according to some embodiments of the present invention.

The first master 112 may be implemented as a micro control unit (MCU) that controls the overall operations of the controller 110, the second master 114 may be implemented as a master that interfaces with the memory device 130 and the third master 116 may be implemented as a master that interfaces with the host 140. The second master 114 supplies control signals CLK, for example, signals /AVD, /CE as illustrated in FIG. 6, to the memory device 130.

The first through third masters 112, 114, and 116 share the bus 118. The arbiter 120 determines (or arbitrates) priority to use the bus 118 among the first through third masters 112, 114, and 116. Aspects of implementation of a bus request signal and a bus grant signal exchanged between each of the first through third masters 112, 114, and 116, and the arbiter 120 for bus control that are conventional will not be further described herein except as required to fully explain exemplary embodiments of the present invention.

For purposes of explanation herein, it is assumed that the first master 112 has higher priority of use of the bus 118 than the other masters 114 and 116. The first slave 122 may be a data storage device that stores firmware and predetermined data. The first slave 122 may store data that it exchanges with the first master 112 under control of the first master 112. The second slave 124 may be a data storage device that stores data exchanged between the second and third masters 114 and 116. The second master 114 may exchange data with the memory device 130. The third master 116 may exchange data with the host 140. Data exchanged between the host 140 and the memory device 130 may be temporarily stored in the second slave 124. Thus, the second slave 124 may act as a buffer.

The memory device 130 may include, for example, a NAND flash memory core, a NOR interface logic and/or an SRAM buffer. In some embodiments, the memory device 130 may be a logic-embedded NAND flash memory, such as OneNAND™ manufactured by Samsung Electronics. If the memory device 130 is OneNAND™, the operations and construction of the memory device 130 are disclosed in the specifications thereof.

The memory device 130 may be implemented as a chip having a NAND flash memory, a controller logic, a buffer RAM and a hardware ECC. Also, the memory device 130 may be a non-volatile memory device having a NAND flash memory as a core.

When the first master 112 having higher priority than the second master 114 requests the use of the bus 118 while the second master 114 is exchanging data with the memory device 130 and the second slave 124 via the bus 118, the second master 114 sets a level of a clock signal CLK to the memory device 130 and second slave 124 to "low (or, 0)" or "high (or, 1)" during the period where data transmission is to be discontinued (a data hold period shown in FIG. 6). In other words, the second master 114 intercepts (cuts off) the supply of the clock signal CLK to the memory device 130. Thus, data C or H that is output (or will be output) from the second master 114 to the memory device 130 or vice versa is maintained (or held) by the second master 114 or the memory device 130 as illustrated in FIG. 6.

When the second master 114 regains the ownership of the bus 118, it resumes supply of a normally toggled clock signal CLK to the memory device 130. Accordingly, the second master 114 and the memory device 130 can continue to exchange data with each other in synchronization with the clock signal CLK.

Figure 4:
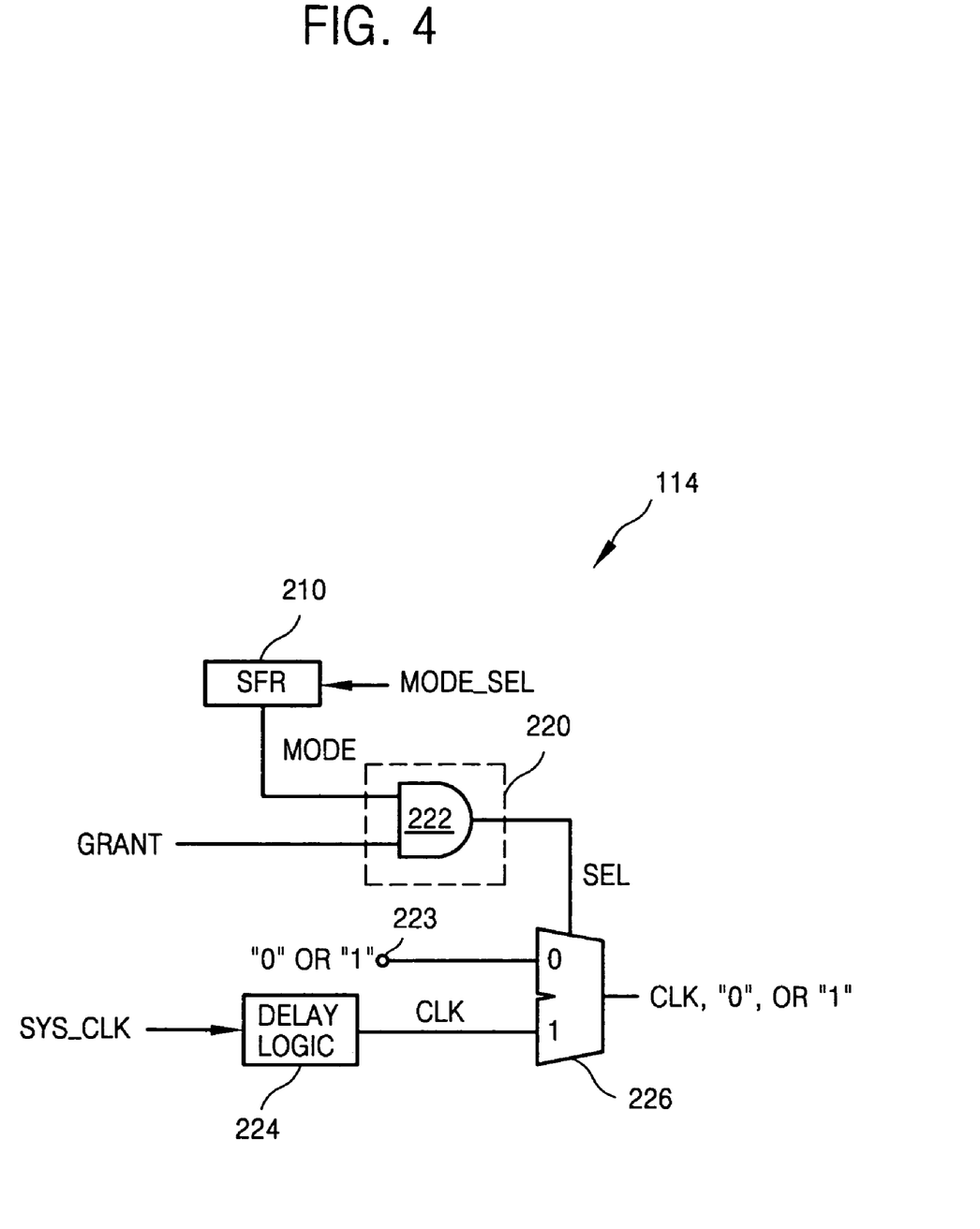
FIG. 4 is a block diagram illustrating a master according to some embodiments of the present invention.

FIG. 4 is a block diagram of the second master 114 illustrated in FIG. 3 according to some embodiments of the present invention. FIG. 6 is a timing diagram of signals output from a master, such as that shown in FIG. 3 through FIG. 5, according to some embodiments of the present invention. Referring to FIGS. 3 and 4, the second master 114 includes a mode information storage circuit 210, a selection signal generation circuit 220, and a selection circuit 226. In some embodiments, the second master 114 may further include a delay logic 224.

The mode information storage circuit 210 stores information regarding an asynchronous data transfer mode or a synchronous data transfer mode. The mode information storage circuit 210 may be, for example, a special function register (SFR) as shown in FIG. 4.

In some exemplary embodiments, data of "0" is input to the mode information storage circuit 210 in the asynchronous data transfer mode, and data of "1" is input to the mode information storage circuit 210 in the synchronous data transfer mode. That is, a mode selection signal MODE_SEL input to the second master 114 has a value of "0" or "1".

In the asynchronous data transfer mode, the second master 114 and the memory device 130 exchange data that is not synchronized with the clock signal CLK supplied to the memory device 130. The synchronous data transfer mode indicates a mode where the second master 114 and the memory device 130 exchange data that is synchronized with the clock signal CLK supplied to the memory device 130.

If the second master 114 has the ownership of the bus 118, the arbiter 120 supplies a first arbitration signal (e.g., an arbitration signal GRANT that is at a high level or a logic "1") to the second master 114. However, when the second master 114 does not have the ownership of the bus 118, the arbiter 120 supplies a second arbitration signal (e.g., an arbitration signal GRANT that is at a low level or a logic "0") to the second master 114.

The selection signal generation circuit 220 receives one of the first and second arbitration signals, and a signal from the mode information storage circuit 210, and generates a selection signal SEL from a logic combination of the received signals. The selection signal generation circuit 220 may be, for example, an AND gate 222 as shown in FIG. 4.

If the second master 114 has the ownership of the bus 118 in synchronous data transfer mode, the selection signal SEL output from the selection signal generation circuit 220 is at a high level or a logic "1". The selection circuit 226 receives a signal having a DC-level via a first input terminal ("0") and a clock signal CLK via a second input terminal ("1"), and supplies the DC-level or the clock signal CLK to the memory device 130, based on the selection signal SEL received from the selection signal generation circuit 220. The selection circuit 226 may be, for example, a multiplexer as shown in FIG. 4.

The DC-level signal has a low level (a logic "0" or a ground voltage level), or a high level (a logic "1" or a supply voltage level). However, the DC-level signal in some embodiments has the low level, which may reduce the consumption of power in the second master 114.

The second master 114 may further include the delay logic 224 that delays a clock signal CLK for a predetermined length of time. That is, the delay logic 224 receives a system clock signal SYS_CLK, and delays it for a predetermined time to generate the clock signal CLK. The delay logic 224 may allow data to be more easily exchanged between the second master 114 and the memory device 130 by adjusting a line delay between the second master 114 and the memory device 130.

Referring now to FIG. 6, when the second master 114 has the ownership of the bus 118 in the synchronous data transfer mode, the second master 114 supplies the normal clock signal CLK to the memory device 130. The data A, B, C, D, E, G, H, I, and J are supplied to the second master 114 in synchronization with a rising edge of the clock signal CLK. In FIG. 6, /AVD denotes address valid detect. During a synchronous read operation, while /AVD remains low for a clock cycle, all of the addresses are latched at a rising edge of the clock signal CLK. /CE denotes a chip enable signal.

When the second master 114 loses the ownership of the bus 118 in the synchronous data transfer mode, the second master 114 supplies the DC-level signal to the memory device 130. As illustrated in FIG. 6, while the DC-level signal is supplied to the memory device 130, the data C and/or H that is output (or will be output) from the second master 114 to the memory device 130 or vice versa, is maintained at a constant logic level until the second master 114 regains the ownership of the bus 118. In other words, the data C and/or H are held. In other words, while the second master 114 does not use the bus 118, it does not supply the clock signal CLK to the memory device 130, which may greatly reduce the consumption of power in the second master 114 and/or the memory device 130.

Figure 5:
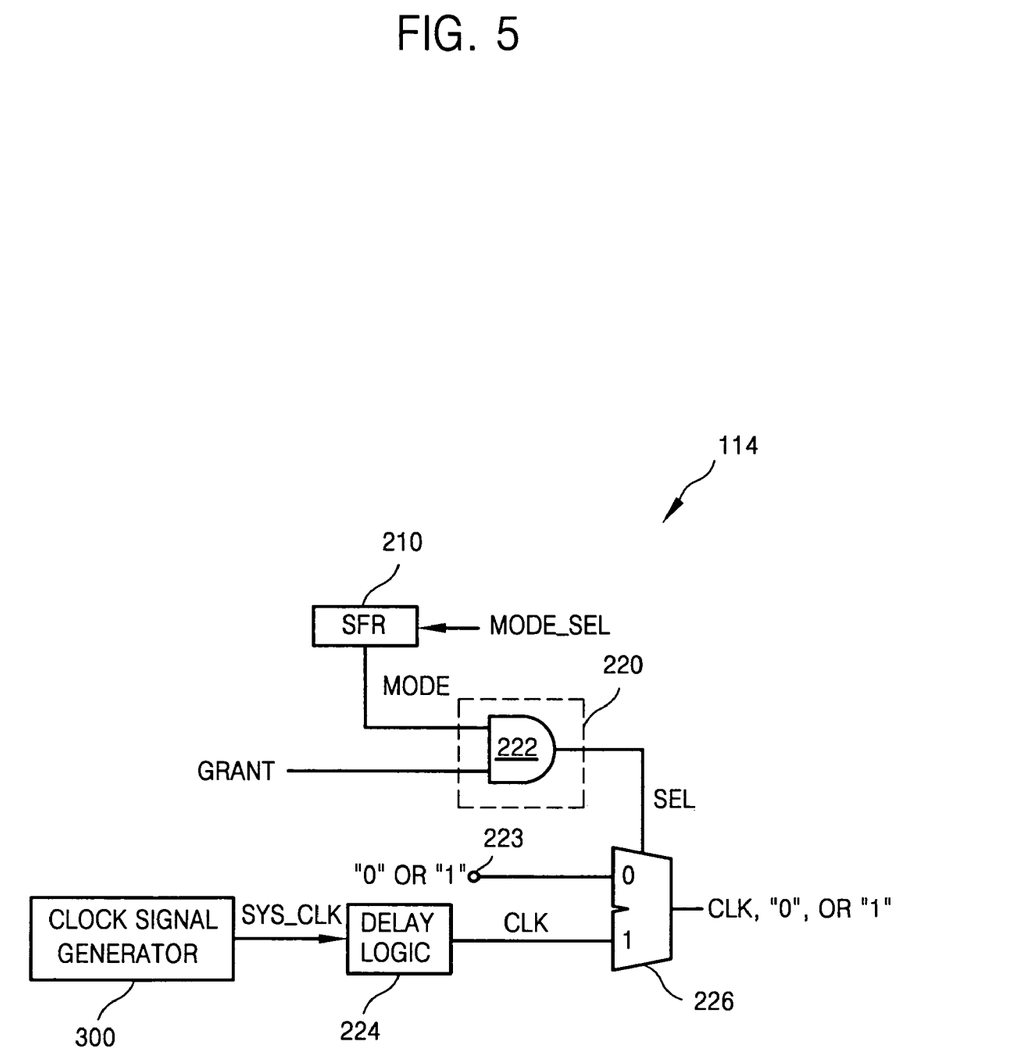
FIG. 5 is a block diagram illustrating a master according to some embodiments of the present invention.

FIG. 5 is a block diagram of the second master 114 according to further embodiments of the present invention. Referring to FIG. 5, the illustrated embodiments differ from those of FIG. 4 discussed above in that the second master 114 further includes a clock signal generator 300 that generates a clock signal SYS_CLK.

Referring to FIGS. 5 and 6, when the second master 114 has the ownership of the bus 118 in the synchronous data transfer mode, it supplies a normal clock signal CLK to the memory device 130 of FIG. 3. However, when the second master 114 loses the ownership of the bus 118 in the synchronous data transfer mode, the second master 114 supplies a DC-level signal to the memory device 130. If the second master 114 regains the ownership of the bus 118 in the synchronous data transfer mode, the second master 114 supplies the normal clock signal CLK to the memory device 130.

Although not shown, the second master 114 in some embodiments includes a direct memory access (DMA). A method of setting the DMA will now be described. First, an address of the second slave 124 at which data will be read or write is written to an initial address register (not shown) of the second master 114. An address of the memory device 130 at which data will be read or write is written to a memory device initial address register (not shown) of the second master 114. The size of data to be transmitted is written to a data counter register (not shown) of the second master 114, using the DMA, a direction of data transmission (a write/read operation) is set in a control register (not shown) of the second master 114, a synchronous read/write operating latency is set, and the DMA is executed.

Figure 7:
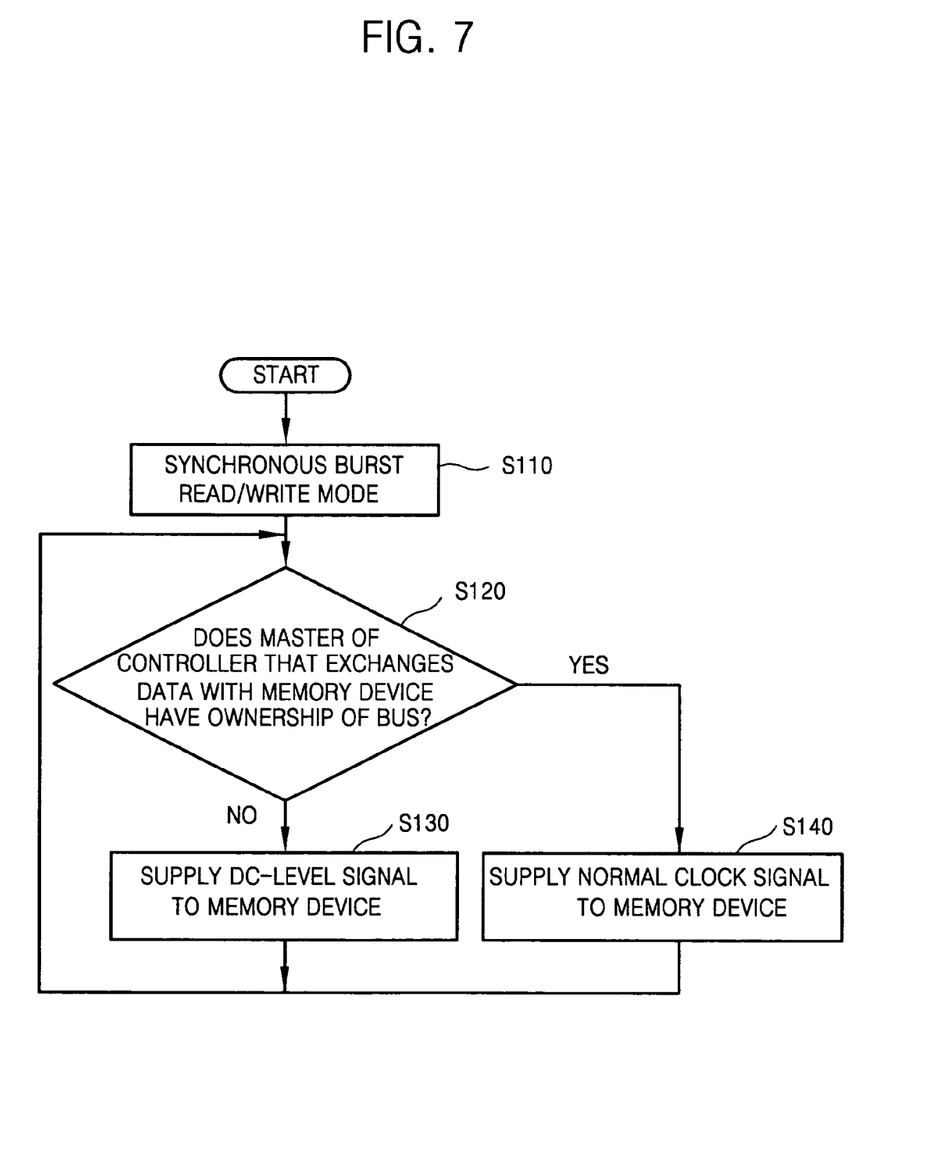
FIG. 7 is a flowchart illustrating a method of supplying a clock signal according to some embodiments of the present invention.

FIG. 7 is a flowchart illustrating a method of outputting a clock signal according to some embodiments of the present invention. Referring to FIGS. 3 through 7, a method of supplying the clock signal CLK will now be described. In the synchronous data transfer mode (or in a synchronous burst read/write mode), data is transmitted from the memory device 130 to the controller 110 or vice versa, in synchronization with the clock signal CLK (S101). In the synchronous data transfer mode, the second master 114 determines whether the second master 114 has the ownership of the bus 118, based on one of first and second arbitration signals received from the arbiter 120 (S120). If the second master 114 has the ownership of the bus 118, the second master 114 supplies the normal clock signal CLK to the memory device 130 (S140). However, if the second master 114 loses the ownership of the bus 118 in the synchronous data transfer mode (S120), the second master 114 supplies a DC-level signal to the memory device 130 (S130). The second master 114 may effectively exchange a large amount of data with the memory device 130 by continuously performing operations S120, S130, and S140.

As described above, a controller according to some embodiments of the present invention controls a clock signal, prevents the clock signal from being supplied to a memory device when data transmission is not allowed in the synchronous data transfer mode and may thereby intercept an unnecessary operation of the memory device. As the supply of the clock signal to the memory device is blocked, it may be possible to reduce unnecessary consumption of power in the controller and the memory device, based on the toggled clock signal.

In some embodiments, even if a situation that interrupts data transmission occurs during transmission of the data to the memory device and then ends, there is no need to reset the controller and/or a system including the controller, which may limit or even prevent degradation of the performances of the controller and the system. Some embodiments of the present invention provide a controller and method for preventing a clock signal from being supplied to a memory device when the controller cannot transmit data to the memory device, and a system including the controller.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An apparatus for controlling data exchange with a memory device, the apparatus comprising:
   a mode information storage circuit that stores an indication of a current data transfer mode; and
   a selection signal generation circuit that receives an arbitration signal indicating when the apparatus has use of a shared bus and a signal from the mode information storage circuit indicating the current data transfer mode and generates a selection signal based on a logic combination of the received signals; and
   a selection circuit that is configured to supply a selected one of a DC-level signal and a clock signal to the memory device responsive to the selection signal from the selection signal generation circuit.

2. The apparatus of claim 1, further comprising a delay logic configured to receive an input clock signal and to delay the input clock signal to generate the clock signal to the memory device and wherein the selection circuit is configured to receive the DC-level signal input via a first input terminal and the delayed input clock signal via a second input terminal and to supply the selected one of the DC-level signal input and the delayed input clock signal to the memory device responsive to the selection signal from the selection signal generation circuit.

3. The apparatus of claim 1, wherein the memory device comprises a logic-embedded NAND flash memory.

4. The apparatus of claim 1, wherein the memory device comprises a NAND flash memory core, a NOR interface, and an SRAM buffer.

5. A controller comprising:
   a bus;
   a first master coupled to the bus;
      a second master connected to the bus, wherein the second master is communicatively coupled to an external semiconductor device and is configured to supply a selected one of a clock signal and a DC-level signal to the semiconductor device, that synchronizes data exchange with the semiconductor device, responsive to an arbitration signal associated with the bus; and
      an arbiter coupled to the bus that is configured to arbitrate ownership of the bus between the first and second masters and to generate the arbitration signal to communicate ownership of the bus;
   wherein the second master comprises:
   a mode information storage circuit that stores an indication of a current data transfer mode;
   a selection signal generation circuit that receives the arbitration signal and a signal from the mode information storage circuit indicating the current data transfer mode and generates a selection signal based on a logic combination of the received signals; and
   a selection circuit that receives the DC-level signal and the clock signal and selectively outputs the DC-level signal or the clock signal responsive to the selection signal from the selection signal generation circuit.

6. The controller of claim 5, wherein the second master supplies the clock signal to the semiconductor device responsive to a first state of the arbitration signal indicating the second master has ownership of the bus or the DC-level signal to the semiconductor device responsive to a second state of the arbitration signal indicating the second master does not have ownership of the bus.

7. The controller of claim 6, wherein the second master includes a selection circuit comprising:
   a first input terminal that receives the DC-level signal;
   a second input terminal that receives the clock signal; and
   an output terminal;
   wherein the selection circuit is configured to output one of the DC-level signal and the clock signal via the output terminal responsive to the arbitration signal.

8. The controller of claim 6, wherein the second master further comprises a clock signal generator that generates the clock signal.

9. The controller of claim 6, wherein the second master comprises:
   a mode information storage circuit that stores an indication of a current data transfer mode, wherein the current transfer mode comprises a synchronous data transfer mode or an asynchronous data transfer mode;
   a selection signal generation circuit that receives the arbitration signal and a signal from the mode information storage circuit indicating the current data transfer mode and generates a selection signal based on a logic combination of the received signals;
   a delay circuit that receives an input clock signal and delays the input clock signal for a predetermined time to generate the clock signal; and
   a selection circuit that receives the DC-level signal and the delayed input clock signal from the delay circuit and selectively outputs the DC-level signal of the delayed input clock signal responsive to the selection signal from the selection signal generation circuit.

10. The controller of claim 9, wherein the second master further comprises a clock signal generator that generates the input clock signal.

11. A system including the controller of claim 9 and further comprising the semiconductor device and wherein the semiconductor device is configured to communicate data with the controller in synchronization with the clock signal from the controller.

12. A system including the controller of claim 6 and further comprising the semiconductor device and wherein the semiconductor device is configured to communicate data with the controller in synchronization with the clock signal from the controller.

13. A system comprising:
   a memory device; and
   a controller, the controller comprising:
   a shared bus;
      a plurality of masters coupled to the shared bus, a first one of which is configured to supply a selected one of a clock signal and a DC-level signal to the memory device to synchronize data transfer between the first master and the memory device in a synchronous data transfer mode responsive to an arbitration signal indicating when the first master has ownership of the shared bus; and
      an arbiter that is configured to arbitrate ownership of the shared bus among the plurality of masters and to generate the arbitration signal to communicate ownership of the shared bus;
   wherein the second master comprises:
   a mode information storage circuit that stores an indication of a current data transfer mode;
   a selection signal generation circuit that receives the arbitration signal and a signal from the mode information storage circuit indicating the current data transfer mode and generates a selection signal based on a logic combination of the received signals; and
   a selection circuit that receives the DC-level signal and the clock signal and selectively outputs the DC-level signal or the clock signal responsive to the selection signal from the selection signal generation circuit.

14. The system of claim 13, wherein the first master supplies the clock signal to the memory device when the first master has ownership of the bus, and the DC-level signal to the memory device when the first master does not have ownership of the bus.

15. The system of claim 13, wherein the memory device is configured maintain data, which is to be transmitted to the first master, responsive to the DC-level signal and then transmits the maintained data responsive to later receipt of the clock signal.

16. A method of supplying a clock signal from a controller having a bus, a first master and a second master coupled to the bus, the controller coupled to a shared resource to a memory device, the clock signal being used for synchronizing data transfer between the controller and the memory device, the method comprising:

supplying a DC-level signal from the controller to the memory device when the controller does not have ownership of the shared resource;

holding data that is to be transferred from the memory device responsive to supplying the DC-level signal;

supplying the clock signal to the memory device when the controller regains the ownership of the internal resources; and transferring the held data from the memory device responsive to supplying the clock signal;

wherein the second master comprises:

a mode information storage circuit that stores an indication of a current data transfer mode;

a selection signal generation circuit that receives the arbitration signal and a signal from the mode information storage circuit indicating the current data transfer mode and generates a selection signal based on a logic combination of the received signals; and a selection circuit that receives the DC-level signal and the clock signal and selectively outputs the DC-level signal or the clock signal responsive to the selection signal from the selection signal generation circuit.

* * * * *